(12) United States Patent
Ezawa et al.

(10) Patent No.: US 6,656,992 B2
(45) Date of Patent: Dec. 2, 2003

(54) RUBBER COMPOSITION

(75) Inventors: Naofumi Ezawa, Tokyo (JP); Yasuo Fukushima, Tokyo (JP); Susumu Shibusawa, Kanagawa-ken (JP)

(73) Assignees: Bridgestone Corporation, Tokyo (JP); Showa Denko K.K, Tokyo (JP)

( * ) Notice: Subject to any disclaimer, the term of this patent is extended or adjusted under 35 U.S.C. 154(b) by 0 days.

(21) Appl. No.: 09/433,886

(22) Filed: Nov. 4, 1999

(65) Prior Publication Data

US 2003/0149161 A1 Aug. 7, 2003

(30) Foreign Application Priority Data

Nov. 9, 1998 (JP) ............................................. 10-317932
Nov. 9, 1998 (JP) ............................................. 10-317938

(51) Int. Cl.$^7$ .............................. C08J 5/10; C08K 3/10; C08L 7/00; C08L 9/00

(52) U.S. Cl. ........................ 524/437; 524/492; 524/493; 524/494; 524/495; 524/496

(58) Field of Search ................................. 524/437, 492, 524/493, 494, 495, 496; 523/210, 212, 213

(56) References Cited

FOREIGN PATENT DOCUMENTS

| EP | 697 432 | 2/1996 |
|----|---------|--------|
| EP | 807 603 | 11/1997 |
| EP | 810 258 | 12/1997 |

*Primary Examiner*—James J. Seidleck
*Assistant Examiner*—U. K Rajguru
(74) *Attorney, Agent, or Firm*—Sughrue Mion, PLLC

(57) ABSTRACT

A rubber composition for a tire tread which comprises (A) a rubber component selected from the group consisting of natural rubber and synthetic diene-based rubbers, (B) 5 to 50 parts by weight per 100 parts by weight of the rubber component of (b1) aluminum hydroxide particles which are treated with a surface treating agent on the surface and have an average diameter of secondary particles $D_2$ of 10 μm or smaller or (b2) aluminum hydroxide particles which have an average diameter of secondary particles $D_2$ of 0.8 μm or smaller and a ratio ($D_2/D_1$) of the average diameter of secondary particles $D_2$ to an average diameter of primary particles $D_1$ of 1.7 or smaller and (C) 5 to 80 parts by weight per 100 parts by weight of the rubber component of at least one filler selected from carbon black and silica. The rubber composition is used for a tire tread and provides a tire which exhibits improved abrasion resistance while the excellent performance on wet roads and the low fuel consumption exhibited by a tire using a conventional rubber composition containing aluminum hydroxide are maintained.

5 Claims, No Drawings

RUBBER COMPOSITION

BACKGROUND OF THE INVENTION

1. Field of the Invention

The present invention relates to a rubber composition for a tire tread, and more particularly to a rubber composition providing a tire which exhibits improved abrasion resistance while the excellent performance on wet roads and the low fuel consumption exhibited by a tire using a conventional rubber composition containing aluminum hydroxide are maintained.

2. Description of the Related Arts

Carbon black is generally used as the reinforcing filler for rubber compositions because carbon black can provide higher reinforcing ability and more excellent abrasion resistance than other fillers to rubber compositions.

Energy saving is a recent social requirement and smaller heat buildup in a rubber composition for a tire, which means smaller rolling resistance of a tire, is required to achieve reduction of fuel consumption of automobiles. For this purpose, the amount of carbon black used in the rubber compositions may be decreased or carbon black having greater particle diameters may be used. However, it is known that the reinforcing property, abrasion resistance and the gripping property on wet roads are inevitably deteriorated in both cases.

As the filler which can satisfy the requirement for the low heat buildup while the reinforcing property, abrasion resistance and the gripping property on wet roads are maintained, precipitated silica is known, and many patent applications have been made on them. Examples of such applications include Japanese Patent Application Laid-Open Nos. Heisei 3(1991)-252431, Heisei 6(1994)-248116, Heisei 7(1995)-70369, Heisei 7(1995)-188466, Heisei 7(1995)-196850, Heisei 8(1996)-225684, Heisei 8(1996)-245838 and Heisei 8(1996)-337687.

However, precipitated silica has a drawback in that a rubber composition containing precipitated silica has a smaller storage modulus than a rubber composition containing carbon black having approximately the same specific surface area, and provides a tire showing inferior driving performance on dry roads.

It is known that the gripping property on wet roads can be improved by raising the glass transition temperature (Tg) of rubber, i.e., by increasing tan δ at 0° C. However, raising Tg of rubber causes problems in that properties at low temperatures become inferior, and in that rolling resistance increases, i.e., the low fuel consumption deteriorates.

Various technologies have been disclosed to overcome the above problems. Examples of such technologies include: (1) a rubber composition for a tire tread which provides an improved gripping property on wet roads by the use of a specific silica and of an improved mixing method (European Patent No. 501227); (2) a rubber composition for a tire tread which provides improved wet skid resistance while maintaining low heat buildup property without adverse effect on workability and abrasion resistance (Japanese Patent Application Laid-Open No. Heisei 7(1995)-149950); (3) a rubber composition for a tire tread which provides an improved gripping property on wet roads and semi-wet roads in low and high temperature ranges and improved workability (Japanese Patent Application Laid-Open No. Heisei 8(1996)-59893); and (4) a rubber composition for a tire tread which provides an improved gripping property on wet roads and semi-wet roads in low and high temperature ranges without adverse effect on abrasion resistance (Japanese Patent Application Laid-Open No. Heisei 8(1996)-59894).

However, the above technologies have drawbacks. In the technology described in (1), the rubber composition shows inferior workability (processability). In the technology described in (2), the rubber composition does not provide sufficient abrasion resistance. In the technologies described in (3) and (4), the reinforcing filler must be used in an excessively great amount.

On the other hand, it is known that aluminum hydroxide can be used as a reinforcing filler for rubber. A tire in which a rubber composition containing aluminum hydroxide is used for its tire tread shows excellent performance, such as the gripping property on wet roads, and provides the low fuel consumption. However, this tire has a drawback in that abrasion resistance is inferior.

SUMMARY OF THE INVENTION

An object of the present invention is to provide a rubber composition for a tire tread which, when the rubber composition is used for a tire tread for automobiles, provides improved abrasion resistance while the excellent performance on wet roads and the low fuel consumption exhibited by a tire using a conventional rubber composition containing aluminum hydroxide are maintained.

As the result of intensive studies by the present inventors to develop a rubber composition having the above advantageous properties, it was found that the above object can be achieved by mixing a specific amount of specific aluminum hydroxide particles with a rubber component selected from the group consisting of natural rubber and synthetic diene-based rubbers and using a specific amount of carbon black and/or silica powder in combination. The present invention has been completed on the basis of this knowledge.

The present invention provides a rubber composition for a tire tread which comprises (A) a rubber component selected from the group consisting of natural rubber and synthetic diene-based rubbers, (B) 5 to 50 parts by weight per 100 parts by weight of the rubber component of (b1) aluminum hydroxide particles which are treated with a surface treating agent on a surface and have an average diameter of secondary $D_2$ of 10 µm or smaller or (b2) aluminum hydroxide particles which have an average diameter of secondary particles $D_2$ of 0.8 µm or smaller and a ratio ($D_2/D_1$) of the average diameter of secondary particles $D_2$ to an average diameter of primary particles $D_1$ of 1.7 or smaller and (C) 5 to 80 parts by weight per 100 parts by weight of the rubber component of at least one filler selected from carbon black and silica.

DESCRIPTION OF THE PREFERRED EMBODIMENTS

In the rubber composition of the present invention, natural rubber and/or synthetic diene-based rubbers are used as component (A). Examples of the synthetic diene-based rubber include synthetic polyisoprene rubber (IR), polybutadiene rubber (BR), styrene-butadiene rubber (SBR), acrylonitrile-butadiene rubber (NBR), chloroprene rubber (CR) and butyl rubber (IIR).

A single type or a combination of two or more types of natural rubber and/or synthetic diene-based rubbers may be used as component (A).

As the aluminum hydroxide particles $D_2$ of component (b1) used in the rubber composition of the present invention, aluminum hydroxide particles which are treated with a surface treating agent on the surface and have an average diameter of secondary particles $D_2$ of 10 μm or smaller are used. The surface of the aluminum hydroxide particles (aluminum hydroxide powder) is treated with a surface treating agent so that particles having particularly large diameters in the used particles do not work as nuclei of failure and formation of aggregates of aluminum hydroxide particles which may work as nuclei of failure is prevented.

When the average diameter of secondary particles $D_2$ in the aluminum hydroxide particles which are treated with a surface treating agent on the surface exceeds 10 μm, the reinforcing effect is not sufficiently exhibited to cause inferior abrasion resistance and, moreover, the gripping property on wet roads (the performance on wet roads) becomes inferior. Moreover, as the average diameter of secondary particles $D_2$ becomes smaller, the particles agregates more readily. As a result, the properties of the rubber compostion may be detriorated due to the insufficient dispersion of the particles into rubber. From the standpoint of the balance between abrasion resistance, the performance on wet roads and the low fuel consumption, the average diameter of secondary particles $D_2$ in the aluminum hydroxide particles is preferably in the range of 0.2 to 10.0 μm and more preferably in the range of 0.4 to 0.8 μm.

The surface treating agent used for the treatment of the surface of the aluminum hydroxide particles is not particularly limited and a desired agent can be selected from various conventional surface treating agents. Among the conventional surface treating agents, silane coupling agents and stearic acid are preferable and silane coupling agents are more preferable.

Examples of the silane coupling agent include compounds represented by the general formula $R_a(RO)_{3-a}Si-A^1-S_m-A^2-Si(OR)_{3-a}R_a$ or $X-S_m-A^1-SiR_a(OR)_{3-a}$, wherein R represents a group which can be hydrolyzed, such as methyl group and ethyl group, X represents a functional group reactive with organic substances such as mercaptoalkyl groups, aminoalkyl groups, vinyl group, epoxy group, glycidoxyalkyl groups, benzothiazolyl group and N,N-dimethylcarbamoyl group, $A^1$ and $A^2$ each represents an alkylene group having 1 to 9 carbon atoms, m represents a positive number satisfying the relation: $0<m\leq9$, and a represents a real number of 0 to 2. Specific examples of the silane coupling agent include sulfide silane compounds, such as bis(3-triethoxysilylpropyl) polysulfide, bis(3-trimethoxysilylpropyl) polysulfide, bis(3-methyldimethoxysilylpropyl) polysulfide, bis(3-triethoxysilylethyl) polysulfide, 3-trimethoxysilylpropyl-N,N-dimethylcarbamoyl polysulfide, 3-trimethoxysilylpropylbenzothiazolyl polysulfide and 3-trimethoxysilylpropylmethacryloyl monosulfide; mercaptosilane compounds such as 3-mercaptopropyltrimethoxysilane, 3-mercaptopropyltriethoxysilane and 3-mercaptopropylmethyldimethoxysilane; vinylsilane compounds, such as vinyltriethoxysilane and vinyltrimethoxysilane; amino compounds, such as 3-aminopropyltriethoxysilane and 3-aminopropyltrimethoxysilane; and glycidoxysilane compounds, such as γ-glycidoxypropyltrimethoxysilane and γ-glycidoxypropylmethyldiethoxysilane. Among these compounds, vinylsilane compounds are preferable.

As the aluminum hydroxide particles (aluminum hydroxide powder) of component (b2) in the rubber composition of the present invention, it is necessary that aluminum hydroxide particles which have an average diameter of secondary particles $D_2$ of 0.8 μm or smaller and a ratio ($D_2/D_1$) of the average diameter of secondary particles $D_2$ to an average diameter of primary particles $D_1$ of 1.7 or smaller be used.

The average diameter of secondary particles $D_2$ is an average diameter obtained by the measurement using a laser diffraction type analyzer of distribution of particle diameters after dispersion of the particles by ultrasonic vibration. The average diameter of primary particles $D_1$ is an average diameter obtained from the BET specific surface area in accordance with the following equation:

$$D_1=6/\{(\text{BET specific surface area})\times(\text{true specific gravity})\}$$

wherein the BET specific surface area is a value obtained in accordance with the one-point method of nitrogen adsorption of Japanese Industrial Standard R1626 after drying the sample at 110° C. for 30 minutes.

When the aluminum hydroxide particles have an average diameter of secondary particles $D_2$ exceeding 0.8 μm or an excessively large average diameter of primary particles $D_1$, the reinforcing effect is not sufficiently exhibited, which causes inferior abrasion resistance and, moreover, the gripping property on wet roads (the performance on wet roads) becomes inferior. When the particles are excessively small, aggregation of the particles becomes stronger and the ratio ($D_2/D_1$) of the average diameter of secondary particles $D_2$ to the average diameter of primary particles $D_1$ may exceed 2, then the particles cannot be dispersed sufficiently into rubber and a rubber composition having the desired properties cannot be obtained. From the standpoint of the balance among abrasion resistance, the performance on wet roads and the low fuel consumption, it is preferable that the aluminum hydroxide particles have an average diameter of secondary particles $D_2$ of 0.8 μm or smaller and more preferably 0.5 μm or smaller, an average diameter of primary particles $D_1$ of 0.35 μm or smaller and more preferably 0.30 μm or smaller, and a ratio $D_2/D_1$ of 1.7 or smaller and more preferably 1.5 or smaller.

In the present invention, a single type or a combination of two or more types of the aluminum hydroxide particles may be used as component (B). The content of component (B) is in the range of 5 to 50 parts by weight per 100 parts by weight of component (A). When the content is less than 5 parts by weight, sufficient gripping on wet roads cannot be obtained and the object of the present invention cannot be achieved. When the content exceeds 50 parts by weight, abrasion resistance deteriorates and there is the possibility that other physical properties required for a rubber composition are adversely affected. When abrasion resistance and the low fuel consumption are considered, the content of component (B) is preferably in the range of 10 to 30 parts by weight.

In the rubber composition of the present invention, at least one filler selected from carbon black and silica is used as component (C). Examples of the carbon black include channel black, furnace black, acetylene black and thermal black which are produced in accordance with different processes. Any of these types of carbon black may be used. Carbon black having a surface area by nitrogen adsorption (BET) of 90 $m^2$/g or greater and a dibutyl phthalate absorption (DBP) of 100 ml/100 g or greater is preferably used. When BET is smaller than 90 $m^2$/g, it is difficult that sufficient abrasion resistance is obtained. An excessively great BET causes deterioration in the low fuel consumption. When abrasion resistance and the low fuel consumption are considered, the more preferable range of BET is 90 to 300 $m^2$/g. BET of carbon black is measured in accordance with the method of ASTM D3037-88. When DBP is smaller than 100 ml/100 g, it is difficult that sufficient abrasion resistance is obtained. An excessively great DBP causes deterioration in the low fuel consumption. When abrasion resistance and the low fuel consumption are considered, the more preferable range of DBP is 50 to 200 ml/100 g. DBP is measured in accordance with the method of Japanese Industrial Standard K6221-1982 (method A).

The type of silica used is not particularly limited. Silica can be suitably selected from those conventionally used for reinforcement of rubber composition, such as dry silica and precipitated silica. When abrasion resistance and the low fuel consumption are considered, silica having a specific surface area by nitrogen adsorption (BET) in the range of 70 to 300 m$^2$/g is preferable. BET of the silica is measured in accordance with the method of ASTM D4820-93 after drying the sample at 300° C. for 1 hour.

In the rubber composition of the present invention, when silica is used as component (C), the composition may further comprise a surface treating agent as component (D) to enhance the effect of component (C), where desired. The surface treating agent is not particularly limited. A surface treating agent can be suitably selected from various conventionally used surface treating agents. Among such surface treating agents, silane coupling agents are preferable. Examples of the silane coupling agent include the compounds described above as examples of the silane coupling agent for surface treating.

In the present invention, a single type or a combination of two or more types of the surface treating agent may be used where desired. In general, the content is selected in the range of 1 to 20% by weight of the amount of the silica in component (C). When the content is less than 1% by weight, there is the possibility that the effect of the surface treating agent is not sufficiently exhibited. When the content exceeds 20% by weight, the effect of the surface treating agent may not be exhibited to the extent expected from the used amount and, moreover, the amount may be economically disadvantageous. When the effect of the surface treating agent and economy are considered, the content of the surface treating agent is preferably in the range of 2 to 15% by weight of the amount of silica.

The rubber composition of the present invention may further comprise, where desired, various additives generally used in the rubber industry, such as vulcanizing agents, vulcanization accelerators, antioxidants, scorch retarders, softeners, other fillers, zinc oxide and stearic acid so long as the object of the present invention is not adversely affected.

The rubber composition of the present invention obtained as described above can be used for a tire tread. When the rubber composition is used for a tire tread, a tire having an excellent balance among the performance on wet roads, the low fuel consumption and abrasion resistance is provided.

To summarize the advantage of the present invention, the rubber composition of the present invention is used for a tire tread and provides a tire which exhibits improved abrasion resistance while the excellent performance on wet roads and the low fuel consumption exhibited by a tire using a conventional rubber composition containing aluminum hydroxide are maintained.

EXAMPLES

The present invention will be described more specifically with reference to examples in the following. However, the present invention is not limited to the examples.

The properties of a vulcanized rubber were measured in accordance with the following methods.

(1) Wet Skid Resistance (Gripping Property on Wet Roads)

The value of tan δ measured using SPECTROMETER manufactured by TOYO SEIKI SEISAKUSHO, Ltd. under the condition of a dynamic strain amplitude of 0.1%, a frequency of 52 Hz and a temperature of 0° C. was used for evaluation of the wet skid resistance and expressed as an index based on the value obtained in Comparative Example 1 which was set at 100. The greater the value, the better the wet skid resistance.

(2) Rolling Resistance

The reciprocal of the value of tan δ measured in accordance with the same method as that described above except that the temperature was changed to 60° C. was used for evaluation of the rolling resistance and expressed as an index based on the value obtained in Comparative Example 1 which was set at 100. The greater the value, the better the rolling resistance.

(3) Abrasion Resistance

The test of abrasion resistance was conducted using a Lambourn abrasion tester in the condition of a slipping ratio of 25%. The reciprocal of the amount of abraded rubber was used for evaluation of the abrasion resistance and expressed as an index based on the value obtained in Comparative Example 1 which was set at 100. The greater the value, the better the abrasion resistance.

Preparation Example 1

The surface of aluminum hydroxide particles (manufactured by SHOWA DENKO K. K.; trade name: HIGILITE H-43M; average diameter of secondary particles D2: 0.6 μm) was treated with vinyltrimethoxysilane in accordance with the method shown in the following to prepare aluminum hydroxide particles treated with a vinylsilane compound.

While the above aluminum hydroxide particles were mixed by force in a Henschel mixer, vinyltrimethoxysilane (manufactured by CHISSO Corporation; trade name: S-210) in an amount of 2.0% by weight of the aluminum hydroxide particles was added dropwise. The temperature inside the mixer was adjusted to 110±10° C. and the mixing was continued for 1 hour in this temperature range to prepare the aluminum hydroxide particles treated with a vinylsilane compound.

Preparation Example 2

The surface of aluminum hydroxide particles (HIGILITE H-43M described above) was treated with stearic acid in accordance with the method shown in the following to prepare aluminum hydroxide particles treated with stearic acid.

In a Henschel mixer, powder of stearic acid in an amount of 2.0% by weight of aluminum hydroxide particles was added to the above aluminum hydroxide particles and the components were mixed by force. The temperature inside the mixer was adjusted to 110±10° C. and the mixing was continued for 1 hour in this temperature range to prepare the aluminum hydroxide particles treated with stearic acid.

Preparation Example 3

The surface of aluminum hydroxide particles (HIGILITE H-43M described above) was treated with 3-mercaptopropyltrimethoxysilane in accordance with the method shown in the following to prepare aluminum hydroxide particles treated with a mercaptosilane compound.

While the above aluminum hydroxide particles were mixed by force in a Henschel mixer, γ-mercaptopropyltrimethoxysilane (manufactured by NIPPON UNICAR Co., Ltd.; trade name: A-189) in an amount of 1.5% by weight of the aluminum hydroxide particles was added dropwise. The temperature inside the mixer was adjusted to 110±10° C. and the mixing was continued for 1 hour in this temperature range to prepare the aluminum hydroxide particles treated with a mercaptosilane compound.

Example 1

To 100 parts by weight of a rubber component composed of 20 parts by weight of natural rubber and 80 parts by weight of SBR 1500 (manufactured by JSR Corporation; styrene-butadiene rubber), 60 parts by weight of carbon black (a product corresponding to N339; manufactured by TOKAI CARBON Co., Ltd.; trade name: SIEST KH; BET: 93 m²/g; DBP: 119 ml/100 g), 6 parts by weight of the aluminum hydroxide particles treated by a vinylsilane compound which was obtained in Preparation Example 1, 6 parts by weight of an aromatic oil, 2 parts by weight of stearic acid, 3 parts by weight of zinc oxide, 2 parts by weight of sulfur, 1.2 parts by weight of a vulcanization accelerator (DPG; diphenylguanidine) and 1.0 part by weight of an antioxidant (6C; N-(1,3-dimethylbutyl)-N'-phenyl-p-phenylenediamine) were mixed. The obtained composition was vulcanized under the condition of 150° C. and 30 minutes and the physical properties of the obtained vulcanizate were measured. The results are shown in Table 1.

Example 2

A vulcanized rubber was prepared in accordance with the same procedures as those conducted in Example 1 except that the aluminum hydroxide particles treated with stearic acid which was obtained in Preparation Example 2 was used in place of the aluminum hydroxide particle treated with a vinylsilane compound which was obtained in Preparation Example 1. The physical properties of the prepared vulcanizate were measured. The results are shown in Table 1.

Example 3

A vulcanized rubber was prepared in accordance with the same procedures as those conducted in Example 1 except that the aluminum hydroxide particles treated with a mercaptosilane compound which was obtained in Preparation Example 3 was used in place of the aluminum hydroxide particle treated with a vinylsilane compound which was obtained in Preparation Example 1. The physical properties of the prepared vulcanizate were measured. The results are shown in Table 1.

Example 4

A vulcanized rubber was prepared in accordance with the same procedures as those conducted in Example 3 except that 30 parts by weight of carbon black (SIEST KH described above) and 30 parts by weight of silica (manufactured by NIPPON SILICA KOGYO Co., Ltd.; trade name: NIPSIL AQ; BET: 195 m²/g) were used in place of 60 parts by weight of carbon black (SIEST KH described above). The physical properties of the prepared vulcanizate were measured. The results are shown in Table 1.

Comparative Example 1

A vulcanized rubber was prepared in accordance with the same procedures as those conducted in Example 1 except that aluminum hydroxide particles without any treatments (HIGILITE H-43M described above) were used in place of the aluminum hydroxide particles treated with a vinylsilane compound. The physical properties of the prepared vulcanizate were measured. The results are shown in Table 1.

TABLE 1

|  | Example | | | | Comparative Example |
|---|---|---|---|---|---|
|  | 1 | 2 | 3 | 4 | 1 |
| Reinforcing material |  |  |  |  |  |
| aluminum hydroxide particles type | B | C | D | D | A |
| amount (part by weight) | 15 | 15 | 15 | 15 | 15 |
| CB (part by weight) | 60 | 60 | 60 | 30 | 60 |
| silica (part by weight) | — | — | — | 30 | — |
| Properties of vulcanized rubber |  |  |  |  |  |
| wet skid resistance | 100 | 100 | 105 | 103 | 100 |
| rolling resistance | 100 | 100 | 102 | 110 | 100 |
| abrasion resistance | 120 | 109 | 105 | 102 | 100 |

Notes:
The amount is expressed by the part weight per 100 parts by weight of the rubber component.
Materials shown in the table are as follows:
(1) Aluminum hydroxide particles
A. HIGILITE H-43M; manufactured by SHOWA DENKO K. K.; averge diameter of secondary particles: 0.6 μm; without any treatments
B. HIGILITE H-43M treated with a vinylsilane compound
C: HIGILITE H-43M treated with stearic acid
D: HIGILITE H-43M treated with a mercaptosilane compound
(2) CB: carbon black; SIEST KD; manufactured by TOKAI CARBON Co., Ltd.: BET: 93 m²/g
(3) Silica: NIPSIL AQ; manufactured by NIPPON SILICA KOGYO Co., Ltd.; BET: 195 m²/g

Example 5

To 100 parts by weight of a rubber component composed of 20 parts by weight of natural rubber and 80 parts by weight of SBR 1500 (manufactured by JSR Corporation; styrene-butadiene rubber), 60 parts by weight of carbon black (a product corresponding to N339; manufactured by TOKAI CARBON Co., Ltd.; trade name: SIEST KH; BET: 93 m²/g; DBP: 119 ml/100 g), 6 parts by weight of fine aluminum hydroxide particles (average diameter of secondary particles $D_2$: 0.37 μm; average diameter of primary particles $D_1$: 0.30 μm; $D_2/D_1$: 1.23), 16 parts by weight of an aromatic oil, 2 parts by weight of stearic acid, 3 parts by weight of zinc oxide, 1 part by weight of sulfur, 1.2 parts by weight of a vulcanization accelerator (DPG; diphenylguanidine) and 1.0 part by weight of an antioxidant (6C; N-(1,3-dimethylbutyl)-N'-phenyl-p-phenylenediamine) were mixed. The average diameter of secondary particles $D_2$ described above was obtained as follows: a sample was placed in an aqueous solution of sodium hexametaphosphate having a concentration of 0.3 g/liter and dispersed by a treatment using an ultrasonic disperser for 15 minutes to decompose aggregates; and the average diameter of secondary particles $D_2$ was then measured by a laser diffraction type analyzer of distribution of particle diameters (MICROTRACK; manufactured by LEEDS & NORTHRUP Company). The average diameter of primary particles $D_1$ described above was obtained as follows: the BET specific surface area of a sample was measured in accordance with the one-point method of nitrogen adsorption of Japanese Industrial Standard R1626 using an apparatus for measuring the relative surface area (QUANTASORB; manufacture by QUANTACHROME Company) after drying the sample at 110° C. for 30 minutes; and the average diameter of primary particles was then obtained from the BET specific surface area in accordance with the following equation:

$$D_1 = 6/\{(\text{BET specific surface area}) \times (\text{true specific gravity})\}$$

The obtained composition was vulcanized in the condition of 150° C. and 30 minutes. The physical properties of the obtained vulcanizate were measured. The results are shown in Table 2.

Example 6

A vulcanized rubber was prepared in accordance with the same procedures as those conducted in Example 5 except that 30 parts by weight of carbon black (a product corresponding to N339) and 30 parts by weight of silica powder (manufactured by NIPPON SILICA KOGYO Co., Ltd.; NIPSIL AQ; BET: 195 m$^2$/g) were used in place of 60 parts by weight of carbon black (a product corresponding to N339) and 4.5 parts by weight of a silane coupling agent (bis(3-triethoxysilylpropyl) tetrasulfide; manufactured by DEGUSSA AG; Si69) was additionally used. The physical properties of the prepared vulcanizate were measured. The results are shown in Table 2.

A vulcanized rubber was prepared in accordance with the same procedures as those conducted in Example 5 except aluminum hydroxide powder (manufactured by SHOWA DENKO K. K.; trade name: HIGILITE H-43M; average diameter of secondary particles D$_2$: 0.60 μm; average diameter of primary particles D$_1$: 0.35 μm; D$_2$/D$_1$: 1.71) was used in place of the fine aluminum hydroxide particles. The physical properties of the prepared vulcanizate were measured. The results are shown in Table 2.

TABLE 2

|  | Example | | Comparative Example |
|---|---|---|---|
|  | 5 | 6 | 2 |
| Reinforcing material | | | |
| aluminum hydroxide particles type | fine particles | fine particles | HIGILITE H-43M |
| amount (part by weight) | 15 | 15 | 15 |
| carbon black (part by weight) | 60 | 60 | 60 |
| silica (part by weight) | — | 30 | — |

TABLE 2-continued

|  | Example | | Comparative Example |
|---|---|---|---|
|  | 5 | 6 | 2 |
| Properties of vulcanized rubber | | | |
| wet skid resistance | 106 | 102 | 100 |
| rolling resistance | 102 | 114 | 100 |
| abrasion resistance | 113 | 110 | 100 |

What is claimed is:

1. A rubber composition which comprises (A) a rubber component selected from the group consisting of natural rubber and synthetic diene-based rubbers, (B) 5 to 50 parts by weight per 100 parts by weight of the rubber component of aluminum hydroxide particles which have an average diameter of secondary particles D$_2$ of 0.5 μm or smaller and a ratio (D$_2$/D$_1$) of the average diameter of secondary particles D$_2$ to an average diameter of primary particles D$_1$ of 1.7 or smaller and (C) 5 to 80 parts by weight per 100 parts by weight of the rubber component of at least one filler selected from carbon black and silica.

2. The rubber composition according to claim 1, wherein the aluminum hydroxide particles of component (b2) have an average diameter of primary particles D$_1$ of 0.35 μm or smaller.

3. The rubber composition according to claim 1, which comprises at least silica powder as component (C) and further comprises (D) a surface treating agent.

4. The rubber composition according to claim 3, wherein the surface treating agent is a silane coupling agent.

5. The rubber composition according to claim 1, wherein the carbon black of component (C) has a specific surface area by nitrogen adsorption (BET) of 90 m$^2$/g or greater and a dibutyl phthalate absorption (DBP) of 100 ml/100 g or greater.

\* \* \* \* \*